(12) United States Patent
Sclater et al.

(10) Patent No.: US 7,620,171 B2
(45) Date of Patent: Nov. 17, 2009

(54) METHOD AND APPARATUS FOR POWERING A DS3 DEVICE

(75) Inventors: James Edward Sclater, Annandale, VA (US); David Owen Corp, Clifton, VA (US)

(73) Assignee: Hubbell Incorporated, Orange, CT (US)

( * ) Notice: Subject to any disclaimer, the term of this patent is extended or adjusted under 35 U.S.C. 154(b) by 1012 days.

(21) Appl. No.: 11/054,602

(22) Filed: Feb. 10, 2005

(65) Prior Publication Data

US 2006/0092961 A1 May 4, 2006

Related U.S. Application Data

(63) Continuation-in-part of application No. 10/976,031, filed on Oct. 29, 2004, now abandoned.

(51) Int. Cl.
*H04M 7/14* (2006.01)
*H04M 9/00* (2006.01)

(52) U.S. Cl. .................. 379/322; 379/323; 379/413

(58) Field of Classification Search .................. 307/75; 323/234; 385/134; 379/322–324, 413
See application file for complete search history.

(56) References Cited

U.S. PATENT DOCUMENTS

| | | | |
|---|---|---|---|
| 3,717,858 A | 2/1973 | Hadden | |
| 3,870,822 A | 3/1975 | Matthews | |
| 3,968,333 A | 7/1976 | Simokat et al. | |
| 4,393,493 A | 7/1983 | Edwards | |
| 4,534,027 A | 8/1985 | Perry | |
| 4,639,714 A | 1/1987 | Crowe | |
| 5,148,144 A | 9/1992 | Sutterlin et al. | |
| 5,216,704 A | 6/1993 | Williams et al. | |
| 5,343,461 A | 8/1994 | Barton et al. | |
| 6,301,340 B1 | 10/2001 | Sansom et al. | |
| 6,329,906 B1 | 12/2001 | Fisher et al. | |
| 6,466,573 B1 | 10/2002 | Renucci | |
| 6,510,204 B2 | 1/2003 | De Clercq et al. | |
| 6,512,762 B1 | 1/2003 | Renucci et al. | |
| 6,546,089 B1 | 4/2003 | Chea, Jr. et al. | |
| 6,574,313 B1 | 6/2003 | Chea, Jr. et al. | |
| 6,580,254 B2 * | 6/2003 | Schofield ............ 323/234 |
| 6,584,197 B1 | 6/2003 | Boudreaux, Jr. et al. | |

(Continued)

OTHER PUBLICATIONS

"E/O Networks and ADC Team Up to Power Remote DLC Systems Using High-Powered HDSL", Business Wire, Sep. 25, 1998, printed form http://www.looksmart.com/ on Oct. 25, 2004, 2 pages.
Larus Corporation, "T1 Office Repeater —Automated Span Current Regulating Extended Temperature Range Model 1119", 2 pages, 1993.
ADC Telecommunications, "GR-1089 HDSL A 3 Voltage", Technical Brief, 4 pages, Apr. 1998.

*Primary Examiner*—Harry S Hong
(74) *Attorney, Agent, or Firm*—Stacey J. Longanecker; Mark S. Bicks; Alfred N. Goodman (57) ABSTRACT

A central office module and a remote terminal module are provided for span powering a variety of high speed DS3 and higher-bandwidth communication modules that require sufficiently little power so as to permit their powering over as many as four telephone wires of at least one mile in length. The up to four twisted pairs only provide power between the central office, remote terminal, controlled environment vault, hut or similar location including the telephone room or closet at a large remote site and remote terminal.

10 Claims, 8 Drawing Sheets

U.S. PATENT DOCUMENTS

| | | |
|---|---|---|
| 6,606,383 B1 | 8/2003 | Robinson et al. |
| 2002/0060695 A1 | 5/2002 | Kumar et al. |
| 2002/0196129 A1* | 12/2002 | Mouton et al. ......... 340/310.01 |
| 2003/0095502 A1 | 5/2003 | Glaser et al. |
| 2003/0185385 A1 | 10/2003 | Boudreaux, Jr. et al. |
| 2004/0140718 A1* | 7/2004 | Wise et al. .................... 307/75 |

* cited by examiner

METHOD AND APPARATUS FOR POWERING A DS3 DEVICE

CROSS REFERENCE TO RELATED APPLICATIONS

This application is a continuation-in-part of U.S. patent application Ser. No. 10/976,031, entitled "Method and Apparatus for Powering a DS3 Device", filed Oct. 29, 2004 now abandoned in the U.S. Patent and Trademark Office, the entire disclosure of which is incorporated herein by reference.

Related subject matter is disclosed in co-pending U.S. patent application of Bruce Lipski et al., filed May 30, 2003, entitled "SONET Multiplexer Having Front Panel Access to Electrical and Optical Connectors and Method for Using Same", U.S. Ser. No. 10/448,453; in co-pending U.S. patent application of Bruce Lipski et al., filed even date herewith, entitled "Apparatus And Method For Automatic Provisioning of SONET Multiplexer", U.S. Ser. No. 10/448,461; in co-pending U.S. patent application of Bruce Lipski et al., filed May 30, 2003 entitled "Compact Enclosure for Interchangeable SONET Multiplexer Cards and Method for Using Same", U.S. Ser. No. 10/448,463; in co-pending U.S. patent application of Bruce Lipski et al., filed May 30, 2003 entitled "Apparatus and Method For Increasing the Optical Density of SONET Multiplexer Cards and Method for Using Same", U.S. Ser. No. 10/448,464, the entire contents of each of these applications being expressly incorporated herein by reference.

BACKGROUND OF THE INVENTION

1. Field of the Invention

The present invention relates to providing span powering to a low power DS3 device or any of a family of SONET multiplexing and/or interface devices that transport electrical signals and optical signals, and/or convert between optical and electrical signals or one type of optical signal (such as OC48) to another (such as Gigabit Ethernet). In particular, the present invention relates to an apparatus for providing span powering to a remotely-located DS3 signal device or other signal device over twisted pair conductors.

2. Description of Related Art

As the demand for high bandwidth, high bit rate communications increases (e.g., to accommodate multimedia applications, in particular), fiber optics technology is rapidly advancing to supply the capacity. Synchronous Optical Network (SONET) is the communication hierarchy that has been specified by the American National Standards Institute (ANSI) as a standard for a high-speed digital hierarchy for optical fiber. SONET defines optical carrier (OC) levels and electrically equivalent synchronous transport signals (STSs) for the fiber-optic based transmission hierarchy. The SONET standard is described in more detail in ANS T1.105 and T1.106, and in Bellcore Telecordia Generic Requirements GR-253-CORE and GR-499 standards, which are incorporated herein by reference. Equipment manufacturers may choose to incorporate a subset of these standards sufficient to permit interoperability of equipment and signals at a basic level, such as the ability to transport a DS3 signal from one OC3 system to a different OC3 system over fiber optic cable.

Before SONET, fiber optic systems in the public telephone network used proprietary architectures, equipment, line codes, multiplexing formats and maintenance procedures. The users of this equipment (e.g., Regional Bell Operating Companies and inter-exchange carriers (IXCs) in the United States, Canada, Korea, and Taiwan, among other countries) desired standards such as SONET so they could employ equipment from different suppliers without experiencing incompatibility problems.

SONET defines a technology for carrying many signals of different capacities through a synchronous, flexible, optical hierarchy using a byte-interleaved multiplexing scheme to simplify multiplexing and provide end-to-end network management. The base signal in SONET is a Synchronous Transport Signal level-1 (STS-1) which operates at 51.84 Megabits per second (Mbps). Higher-level SONET signals are summarized in the following table:

TABLE 1

| SONET Hierarchy | | |
|---|---|---|
| Signal | Bit Rate | Capacity |
| STS-1, OC-1 | 51.840 Mb/s | 28 DS1s or 1 DS3 |
| STS-3, OC-3 | 155.520 Mb/s | 84 DS1s or 3 DS3s |
| STS-12, OC-12 | 622.080 Mb/s | 336 DS1s or 12 DS3s |
| STS-48, OC-48 | 2488.320 Mb/s | 1344 DS1s or 48 DS3s |
| STS-192, OC-192 | 9953.280 Mb/s | 5376 DS1s or 192 DS3s |
| STS-768, OC-768 | 39813.12 Mb/s | 21504 DS1s or 768 DS3s |

Thus, each SONET STS-N electrical signal has a corresponding OC-N optical signal. The OC-N signals are created by converting the STS-N electrical signal to an optical signal. The SONET standard establishes a multiplexing format for using any number of 51.84 Mbps signals as building blocks. For example, an OC-3 (Optical Carrier, Level 3) is a 155.52 Mbps signal (i.e., 3 times 51.84 Mbps), and its electrical signal counterpart is referred to as an STS-3 signal. The STS-1 signal carries a DS3 signal or a number of DS1 or other lower level signals. A SONET STS-3 signal is created by concatenating STS-1 signals.

Telecommunication equipment at central offices (COs), remote terminals (RTs), wireless communication cell sites and other equipment locations is frequently deployed as one or more bays with multiple shelves, wherein each shelf is configured to receive a plurality of communications cards. A backplane is provided in each bay for communication between its cards and shelves, as well as for interbay communication. One of the more common types of equipment to be found at these equipment sites is SONET multiplex equipment which takes lower-rate (tributary) signals, such as DS1 (1.5 Mbps), DS3 (45 Mbps), OC-1 (51.84 Mbps), or OC-3 (155.52 Mbps), and time division multiplexes them into a higher-rate signal such as OC-3 or OC-12 (622.08 Mbps). The SONET multiplex equipment also performs the corresponding demultiplex function of recovering the lower rate tributary signals from an incoming higher-rate signal.

Telecommunications companies are eager to provide as much performance as possible from their existing infrastructure. Their telecommunications systems are primarily based on the DS1 electrical signal hierarchy that uses DS0 data. A DS1 signal is comprised of 24 multiplexed DS0 voice channels. To provide capacity that meets the afore-mentioned demand for more bandwidth and high bit rates, telecommunications companies need equipment that is based on a higher data rate such as DS3 in which DS1 signals are the base signal for data channel multiplexing, as opposed to DS0 signals.

Problems with existing equipment managing DS3 traffic, however, are numerous. For example, DS3 hierarchy-based equipment requires more bay and shelf space in CO, RT, cell sites and other locations where equipment space is already a limited commodity, where bays and shelves are already crowded (e.g., many shelf card slots are filled with a card), and where room to add equipment with new features is very limited or essentially nonexistent.

In addition, previous generations of SONET and asynchronous multiplex equipment have dedicated fixed portions of an equipment shelf to different types/rates of services. For example, separate portions of the shelf are typically reserved for DS1, DS3, and OC3 interface units. Dedicating specific portions of the shelf to specific service types reduces the flexibility of the shelf, and typically leaves wasted shelf space for any given application.

Also, access to the optical connectors on existing multiplexer cards is typically on the front of a card, while access to the electrical connectors is on the back of the shelf. In equipment locations were space is limited, it can be difficult for human operators to gain access to the backs of card slots in a shelf of an equipment bay. A need therefore exists for SONET multiplexer equipment having a reduced form factor, with non-dedicated card slots, and with front panel access to both electrical connectors and optical connectors or, if the system includes high speed optical connections such as OC48 and lower speed optical connections such as Gigabit Ethernet, access to all of these connections on the front panel.

In the above co-pending applications, a SONET multiplexer is provided to perform OC3 to DS3 multiplexing and demultiplexing operations using a substantially reduced form factor as compared with existing SONET equipment that can perform the same multiplexing functions. The SONET multiplexer is implemented as a single card (i.e., capable of deployment on a single card slot in a telecommunications bay equipment shelf). The SONET multiplexer comprises a face plate and two attached circuit boards and referred to as the main board and the lower board. The main board comprises a field programmable gate array (FPGA), the operations of which are described in the above-referenced co-pending applications. Thus, the SONET multiplexer is considerably smaller than existing SONET multiplexers having the same functionality, which consist of multiple plug-in cards. While single-card media converters are available to perform optical and electrical signal conversions, they are not able to sufficiently conform to the GR-499 and GR-253 standards to permit interoperability of equipment and signals at a basic level, such as the ability to transport a DS3 signal from one OC3 system to a different OC3 system over fiber optic cable as does the SONET multiplexer as described in the above co-pending applications.

The reduced form factor of the SONET multiplexer therefore overcomes many of the disadvantages of existing multi-card SONET multiplexers since it does not require much equipment space. Further, the SONET multiplexer can be deployed as a standalone component and therefore need not be inserted into a bay shelf at all, but instead can be mounted on the side of a bay, on a wall in the equipment area of the CO, RT or other user, on a top of a computer, table or other work surface, among other places.

The SONET multiplexer of the above listed co-pending applications allows front panel access to three DS3 ports, as well as an OC3 port. The single card implementation of the SONET multiplexer facilitates its use with other cards such as a wave division multiplexer (WDM) and a DS3 to DS1 multiplexer, which are described in the afore-mentioned application Ser. Nos. 10/448,453 and 10/448,463. By way of an example, the O3-3D3 MUX can be used within a high rise building receiving an OC-12 feeder. The O3-3D3 MUX can be used to drop DS3s to different floors. The DS3 to DS1 multiplexer can also be used to drop DS1s to different floors. The configuration of the O3-3D3, the DS3 to DS1 multiplexer and the WDM as single-card building components allows different arrangements of these cards in a small profile chassis or enclosure that is independent of equipment shelves for flexible installations, as described in the afore-mentioned application Ser. Nos. 10/448,453 and 10/448,463. Further, unlike existing SONET equipment, the chassis does not have dedicated card slots as described in more detail below in connection with FIGS. 7B through 7F.

Although compact and flexible configurations of SONET multiplexing and transport devices for DS3 service, as described in co-pending applications, are available, a problem continues to exist with respect to providing power to these devices. Local alternating current (AC) power is required for powering such equipment located at a business' premises even though powering of lower speed (DS0 and or DS1) services is customarily done from communications service provider's Central Offices, Remote Terminals or other provider's locations distant from the business' premises. Due to the increased demand for high speed data networking capabilities, the additional expense of providing local power for the communication is justified. Furthermore, if the business is dependent upon the continuous availability of the high speed networking capability, then the cost of back-up power systems may also be justified. These back-up systems may comprise emergency generators, batteries or similar business-premises-located equipment designed to provide emergency power.

Generators are expensive and usually only large facilities use these. Often times, businesses in large, urban office buildings do not have the luxury of being able to place a large generator outside or on top of the office building. Additionally, if the business is spaced over multiple floors or even adjacent buildings, running power cable between floors or buildings is prohibitively expensive.

Batteries are another solution that is not entirely feasible because of maintenance and storage locations required by the batteries. In addition, the batteries may comprise harmful chemicals that either have special ventilation or handling requirements. Therefore, businesses expend large sums of money to provide reliable power to their telephonic communication devices.

Local emergency power arrangements are inefficient, more expensive to operate and less reliable than the much larger battery and generator arrangements presently in use by telecommunication service providers.

Span power is used to power some communication devices such as telephones that provide plain old telephone service (POTS) or devices used to provide a business customer interface to DS1 service (also known as T1 service). Span power is supplied to the communication equipment on communication wires that are separate and distinct from the wires of the local electrical utility and, further, span power wires may be separate from the wires used to carry services. Typically, the equipment of today, although it requires less power than older equipment, requires more power than what the typical span powering arrangement can provide. An example of prior art span powering is shown in U.S. Pat. No. 6,580,254 B2 issued to Schofield.

A further problem of span power approaches is that the maximum distance between two given nodes is limited by the DC voltage drop on the span power lines. Therefore, conventional high speed communication equipment (such as that providing DS3 or higher speed services) in combination with the DC voltage drop has made span powering of such devices unfeasible.

There is a need for a span powering solution that supports full DS3 or higher speed services as required by the end user without being cost prohibitive due to construction and equipment costs, or severely distance limited as a result of the DC voltage drop, while providing adequate power for the DS3 or higher speed services.

SUMMARY OF THE INVENTION

The embodiments of the present invention overcome the problems of the prior art as outlined above as well as provide additional advantages.

Embodiments of the present invention provide network powering over as many as four outside plant (OSP) copper pairs to a remote terminal to supply power to communication multiplexing equipment, such as that described in the above-referenced co-pending patent applications.

Provided is a power supply system for a telecommunication network comprising a first telecommunication power supply module configured for insertion in a single card slot of a telecommunication equipment mounting at a first telephone company equipment location; wherein said first telecommunication power supply modules provide power to a plurality of second modules at remote telephone company equipment locations, wherein said first telecommunication power supply modules provide power over telephone wires dedicated to only supplying power; and In addition, a plurality of second telecommunication modules at remote telephone company equipment locations comprising a variety of high speed communication modules for sending and receiving communication signals, wherein said first telecommunication power supply provides power to said plurality of second telecommunication modules using up to four twisted-pair telephone wires.

According to an embodiment of the present invention is a method of supplying power to telephone company equipment over a telecommunications network comprising the steps of adapting a first telecommunication power supply module for insertion in a single card slot of a telecommunication equipment mounting at a first telephone company equipment location for supplying power; sending and receiving communication signals by a plurality of second telecommunication modules at remote telephone company equipment locations comprising a variety of high speed communication modules; and providing power to said plurality of second modules at remote telephone company equipment locations, wherein said first telecommunication power supply modules supply power to said plurality of second modules using up to four twisted-pair telephone wires dedicated to only supplying power.

Additionally, the apparatus is capable of plurality of second telephone company equipment modules send and receive said communication signals over telecommunication network wires other than the four twisted-pair telephone wires, which are preferably plain old telephone service wires up to 1 mile in length, used by said first telephone company equipment power supply module to provide power.

In addition, embodiments of the present invention provide plug-and-play installation of the powering modules for easy set up and provisioning. Front panel indicators show the status of power, under voltage, under current, and overload status.

Since the above-mentioned communication multiplexing equipment, as described in the above-referenced co-pending patent applications, requires less power than prior high speed communication equipment and is powered using as many as four twisted pairs, the remote devices may be located at a significant distance (that is, from one to approximately seven miles) away and still have an adequate power supply.

By providing up to four twisted pairs, embodiments of the present invention allow for multiple devices to be powered by load sharing. In addition, by operating in parallel, the embodiments of the present invention double and triple the range of communication multiplexing equipment.

Using power provided by the Central Office (CO) is less expensive than locally provided power and, in the case of new installations, is provided more quickly than having to wait for the utility company or other service to provide power.

Embodiments of the present invention provide network-powered DS3 O3-3D3 SERIES, DS1, T1, high-quality audio and video capabilities, as well as Gigabit Ethernet and other high speed services, thereby eliminating the need for local AC rectifiers, battery backup systems, battery heaters, and bulky cabinets.

BRIEF DESCRIPTION OF THE DRAWINGS

The invention will be more readily understood with reference to the embodiments thereof illustrated in the attached drawing figures, in which.

In the drawing figures, it should be understood that like numerals refer to like features, elements and structures.

DETAILED DESCRIPTION OF EXEMPLARY EMBODIMENTS

The preferred embodiments of the invention will now be described with reference to the attached drawing figures.

Figure 1:
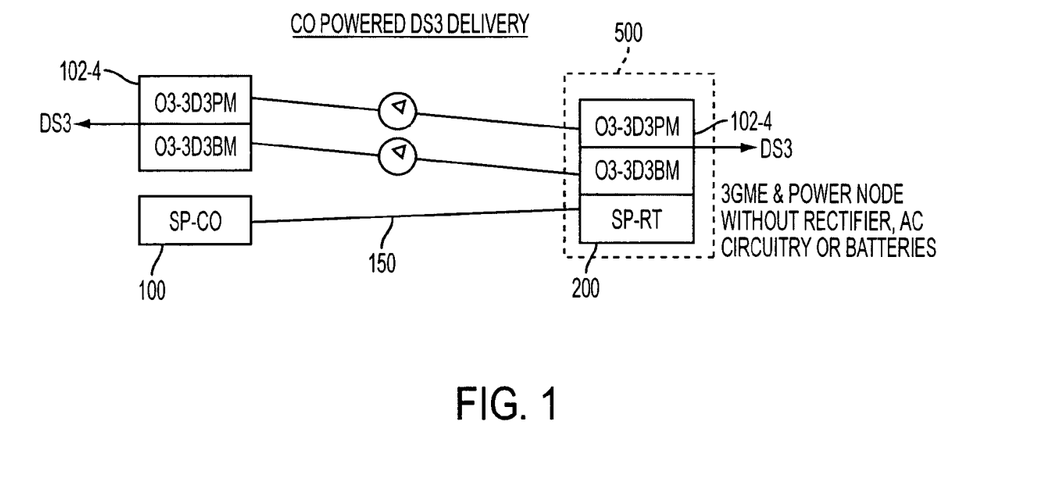
FIG. 1 illustrates a system configuration in accordance with an embodiment of the present invention.

Due to the low power requirements of the class of equipment developed by the assignee of the present application and described in the above-referenced co-pending applications, the entire contents of which are incorporated herein by reference, providing span powering to devices with these category of devices is now possible. The Span Power (SP) system is comprised of two units: SP-CO module 100 and SP-RT module 200. The SP modules, SP-CO module 100 and SP-RT module 200, are preferably implemented as industry-standard Type 200 circuit packs to permit 3GME network or span powering. As noted, the 3GME mounting is demonstrative only. There are many other mounting configurations that may be used and that are compatible with Type 200 circuit packs. The SP-CO module 100 is preferably located at the central office or Remote Terminal and provides power to the SP-RT module 200, which is preferably located at a business customer's site or other remote location. The SP-CO module 100 and SP-RT 200 module provide enough power to reliably power the various multiplexing equipment at significant distances because of the low power requirements of the class of equipment developed by the assignee of the present application and described in the above-referenced co-pending applications. For illustration purposes, the various system configurations are depicted in FIGS. 1 through 3, which provide network-powering capability, with SP-CO 100 and SP-RT 200 span powering modules.

Examples of how the span powering modules are implemented will now be described in further detail with reference to FIGS. 1-3. In the exemplary system configuration of FIG. 1, DS3 electrical communications signals are multiplexed by an O3-3D3 SERIES module 102-4 at a CO to OC-3 optical communication signals for transport via a fiber optic line to a remote terminal or other location. The OC3 optical communication signals are demultiplexed back to one or more DS3 electrical communication signals by an O3-3D3 SERIES module 102 at a business customer's site or other location. The O3-3D3 SERIES modules 102-4 are inserted in a enclosure 500 configured to accept the reduced form factor modules. An example of this type of enclosure is the 3GME enclosure as described in the above-mentioned, co-pending U.S. patent application Ser. No. 10/448,463, the entire contents of which are incorporated herein by reference. The O3-3D3 SERIES module 102 comprises an OC3 port and three DS3 ports and is operable to map optical signals to selected electrical signals and vice versa. By span powering this configuration using twisted pair telephone wire 150, the communications service provider (telephone company and the like) may use power supplied by their central office to power the multiplexing equipment without the need of local AC power, rectifiers, AC circuitry, or batteries.

Figure 2:
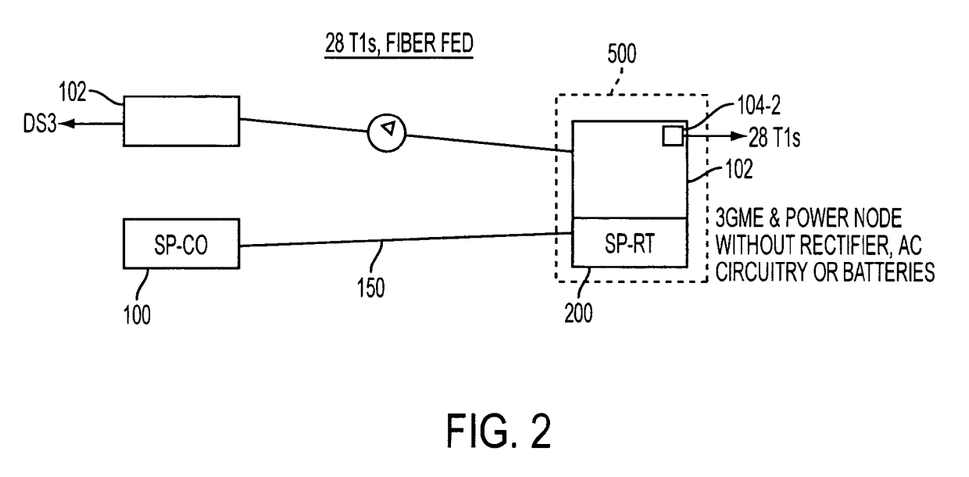
FIG. 2 illustrates another system configuration in accordance with an embodiment of the present invention.

In the exemplary system configuration of FIG. 2, the DS3 electrical communication signal is multiplexed by an O3D3 module (i.e., a module that maps an OC3 signal to a DS3 electrical signal and vice versa) into an OC-3 optical communication signal at the central office location. The OC-3 optical communication signal received at the business customer's site or other remote location is then demultiplexed into a DS3 signal by the remote O3D3. The DS3 is further demultiplexed into 28 T1 lines by a D3-28D1 module 104-2 (e.g., multiplexer for converting DS3 signals to 28 DS1 signals and vice versa). Again, these modules may be span powered by as many as four twisted pairs 150.

Figure 3:
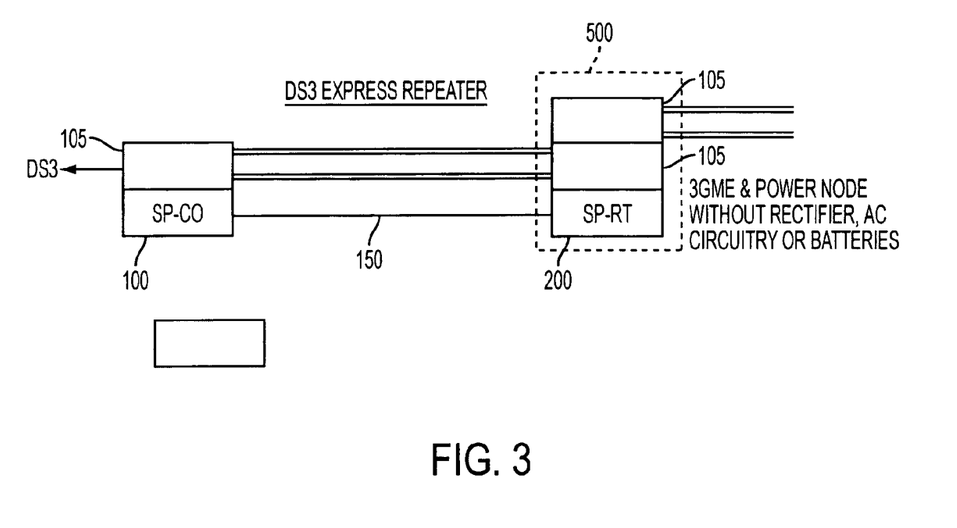
FIG. 3 illustrates yet another system configuration in accordance with an embodiment of the present invention.

In the exemplary system configuration of FIG. 3, the DS3 electrical communication signal is multiplexed by a DS3 Express module 105 into a DS3 electrical communication signal at the central office location. The dual DS3 Express modules 105 at the remote terminal act as a DS3 repeater to extend the distance of the DS3 electrical communication signal. Again, these DS3 Express modules 105 may be span powered by up to four twisted pairs 150.

Figure 4:
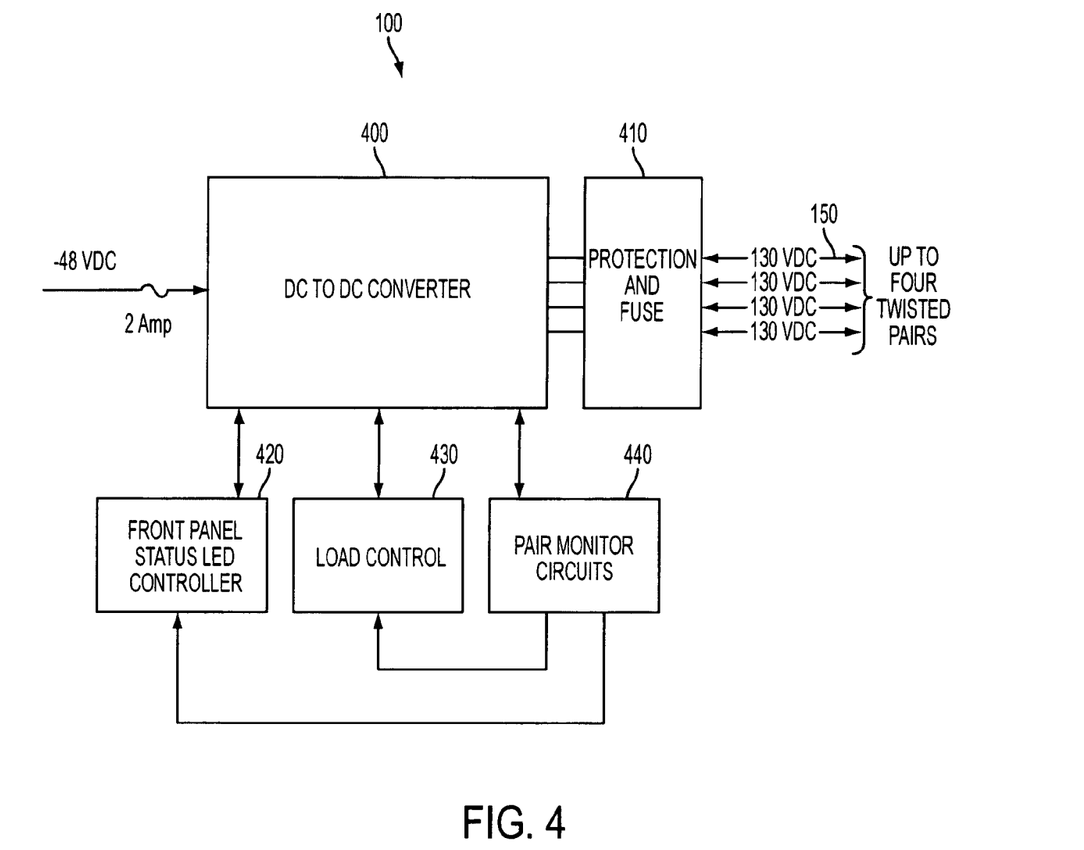
FIG. 4 is a functional block diagram of a span powering module for use at a central office in accordance with embodiment of the present invention that is located at the central office.

Referring to the block diagram in FIG. 4, the SP-CO module 100 will provide substantially 130 VDC at approximately 60 watts or approximately 460 milliamps. The SP-CO module 100 is deployed at the CO or in other telephone company equipment locations, such as a remote terminal, controlled environment vault, hut or similar location including the telephone room or closet at a large remote site, to provide remote powering to the SP-RT module 200 housed in the 3GME, which is an enclosure described in the above-mentioned co-pending applications, or equivalent chassis at the remote high-speed service location.

A DC to DC controller 400 has been designed that provides very robust high voltage capabilities. The DC to DC controller 400 provides very low quiescent current for high efficiency, approximately 180 volt operation and soft start capability. The DC to DC controller uses a transformer, such as a flyback transformer, that will provide up to approximately 1500 Vrms isolation between the 48 volt and frame ground central office or other power source and applies approximately 130 volts dc between the conductors of each twisted pair 150.

The twisted pairs 150 are monitored by pair monitor circuits 440, which then provides signals to the Front panel status LED controller 420, which has indicators on the front of the SP-CO module 100 and SP-RT module 200 of various conditions, such as undervoltage, under current or overload.

Additionally sidactor protection and fusing 410 perform circuit protection under conditions of lightning surge and power cross per the GR-1089-CORE standard. Load control circuits 430 provide high switching voltage protection to critical circuitry under conditions of no load such as when a unit is installed into an empty chassis etc. Typically, an electronic load is switched in during these conditions.

Figure 5:
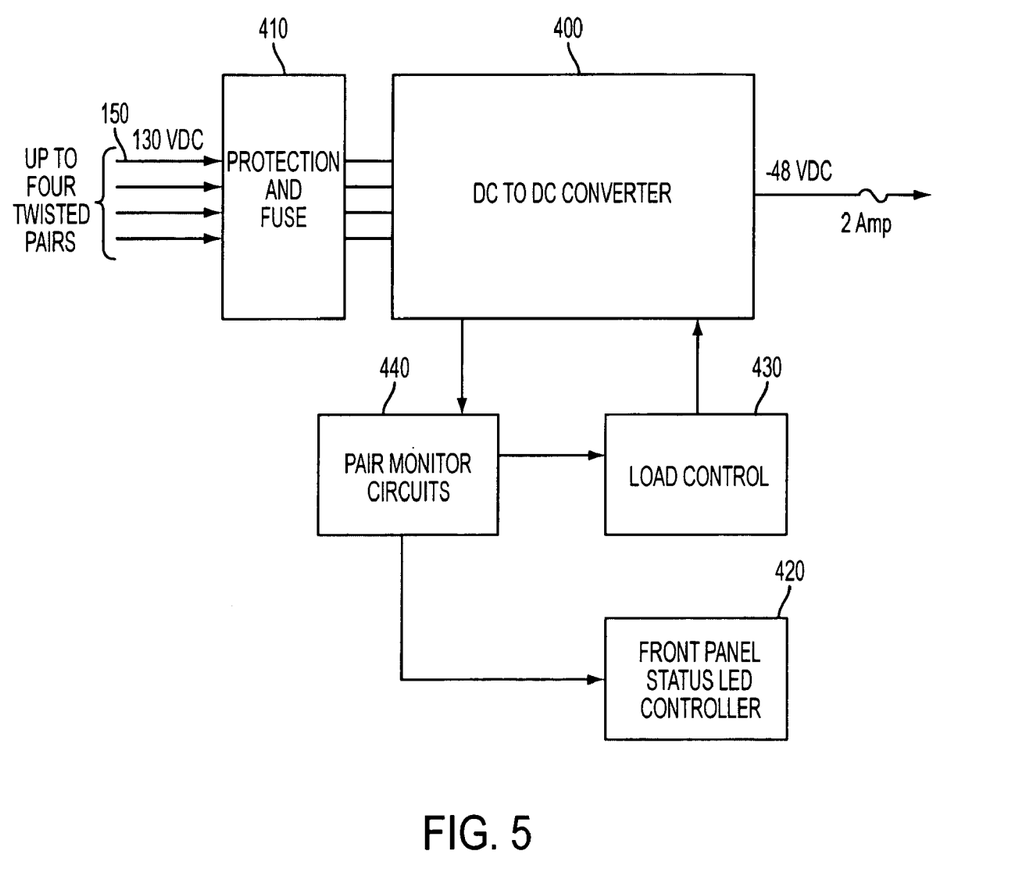
FIG. 5 is a functional block diagram of a span powering module for use at a remote terminal or remote device in accordance with an embodiment of the present invention.

Referring to FIG. 5, the construction of the SP-RT module 200 is nearly identical to the SP-CO module 100. The SP-RT module 200 provides approximately 48 VDC at 520 milliamps or 25 watts to the backplane of the 3GME 500. Additionally sidactor protection and fusing 410 perform circuit protection under conditions of lightning surge and power cross per the GR-1089-CORE standard. The SP-RT module 200 output is preferably diode protected at the DC to DC controller 400, so that multiple units may be installed in parallel to provide redundancy or load sharing. The SP-RT module 200 will power the remote chassis with up to approximately 30 watts at substantially 48 VDC. This is approximately 625 milliamps of load current. Input power for the SP-RT module 200 will be approximately 38 watts. As in the SP-CO module 100, the load control 430 provides high switching voltage protection to critical circuitry under conditions of no load such as when a module under power fails or is removed.

Similar to the SP-CO module 100, the 130 volt twisted pair 150 input to the SP-RT module 200 will be monitored for Under Voltage and the 48 volt output will be monitored for Under Current and Over Load by the pair monitor circuits 440. Under the control of the Front Panel Status LED Controller 420, red LEDs will indicate the occurrence of these conditions. Power on will be indicated on a Green LED with it turning Red under conditions, such a blown input fuse or other loss of power situations. The 48 volt output is automatically connected to the 3GME backplane or the backplane of other Type 200 mountings into which the SP-RT module is installed, simplifying the installation and assuring remote 48 volt connections are correct.

Neither the SP-CO module 100 nor the SP-RT module 200 require programmable devices of any type. Therefore there are no requirements for software programming of the devices or other complicated provisioning operations.

Figure 6A:
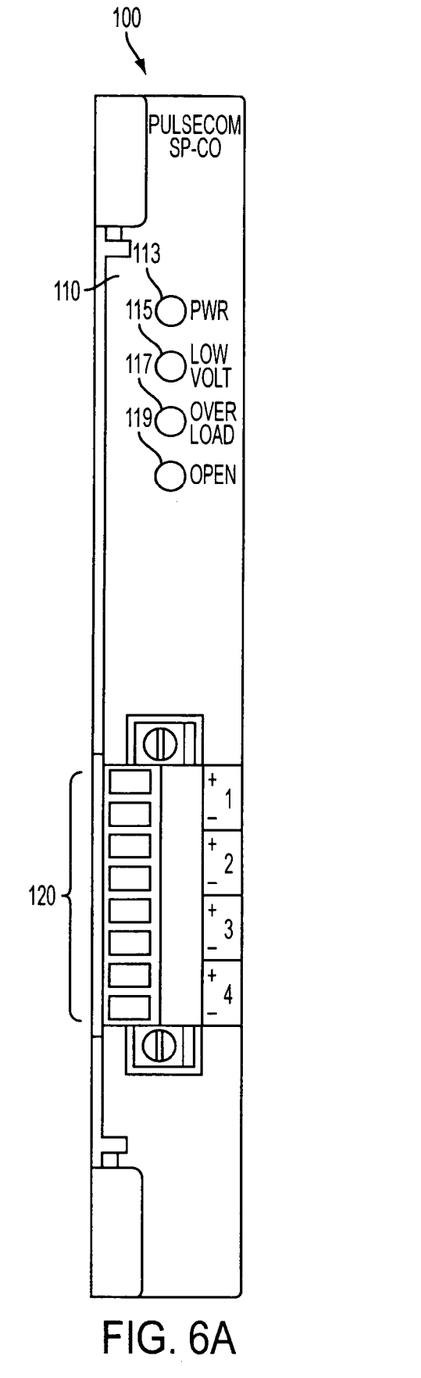
FIG. 6A shows an exemplary faceplate of a span powering module in accordance with an embodiment of the present invention as it would be used in a central office application.
Figure 6B:
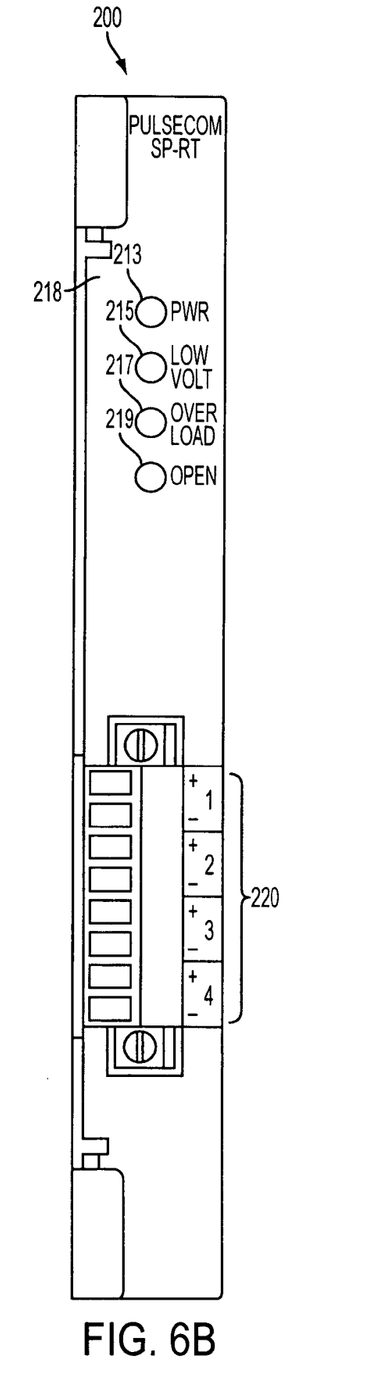
FIG. 6B shows an exemplary faceplate of a span powering module in accordance with an embodiment of the present invention as it would be used in a remote terminal or other remote device application.

FIG. 6A shows the faceplate 110 of SP-CO module 100. Faceplate 110 has LEDs for indicating power 113, low voltage 115, overload 117, and open 119. In addition, twisted pair terminals 120 are used to connect the twisted pairs 150 that provide the 130 VDC to the SP-RT module 200. The network interface is four twisted pair 150 front panel connections, although rear panel connections are optional. Central office twisted pair output monitoring will give front panel indications of Under Voltage, Under Current and Over Load on Red LEDs. Power On will be indicated on a Green LED with it turning Red under conditions of a blown input fuse. FIG. 6B shows the faceplate 210 of the SP-RT module 200. Faceplate 210 has LEDs for indicating power 213, low voltage 215, overload 217, and open 219. In addition, twisted pair terminals 220 are used to connect the twisted pairs 150 that provide the 130 VDC from the SP-CO module 100. The network interface is four twisted pair 150 front panel connections, although rear panel connections are optional. Power On will be indicated on a Green LED with it turning Red under conditions of a blown input fuse.

The physical architecture of the SP-CO and SP-RT modules, 100 and 200, respectively, is a type 200 mechanics unit. It is highly desirable for electromagnetic interference and temperature-rise purposes that the unit has a metal cover, which is provided integral to the units. According to GR-1089-CORE standards, the 130 VDC potentials generated by the Span Power circuits are classified as Class A3. The GR-1089-CORE standard requires that accessibility be made inaccessible to the general public and employees and be restricted to only craftsman. Accordingly, the noted metal cover and an insulated bottom cover with appropriate marking is provided integral to each circuit pack.

The SP-CO and SP-RT modules, 100 and 200, respectively, are designed to meet all requirements under conditions of temperatures between −40° to +65° C. and including relative humidity without condensation between 10% and 95% except that output power is restricted to 25 W unless operating temperatures are between 0° to +55° C. The twisted pair 150 cabling requirements are up to four pairs of 19, 24, 26 or similar types of gauge AWG twisted cable terminated in the preferably front panel eight position right angle plug. Although other types of connectors may be used and the terminations are optionally not required to be made on the front panel of either the SP-CO module 100 or the SP-RT module 200.

Figure 7A:
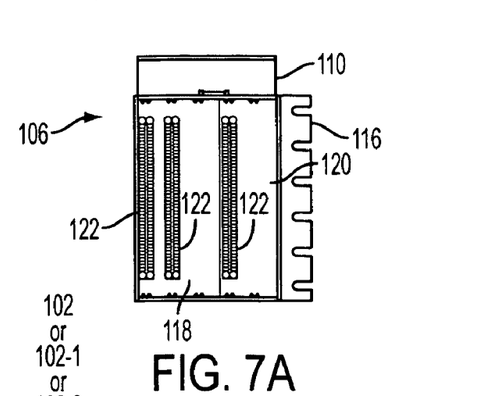
FIG. 7A shows an exemplary enclosure into which the exemplary span power module would be inserted according to an embodiment of the present invention.
Figure 7B:
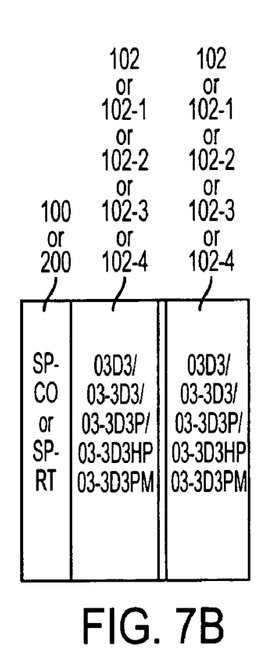
FIGS. 7B through 7F show exemplary configurations of communication devices in use with an exemplary span power module according to different embodiments of the present invention.
Figure 7C:
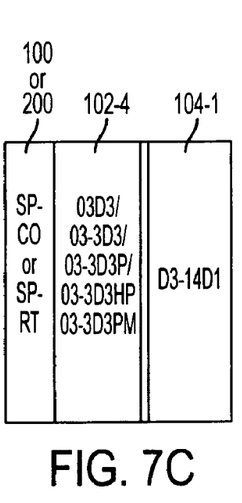
Figure 7D:
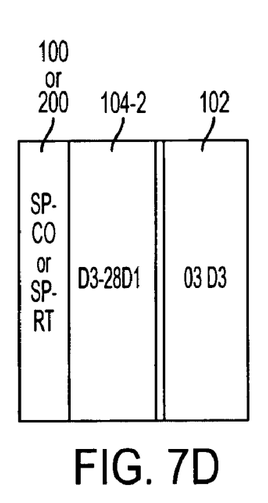
Figure 7E:
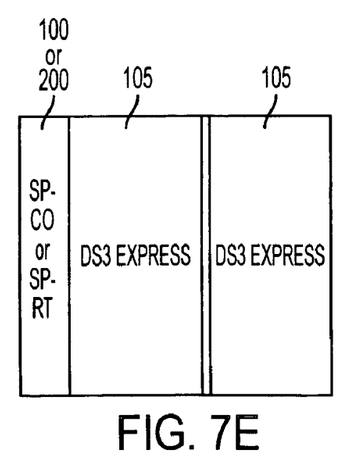
Figure 7F:
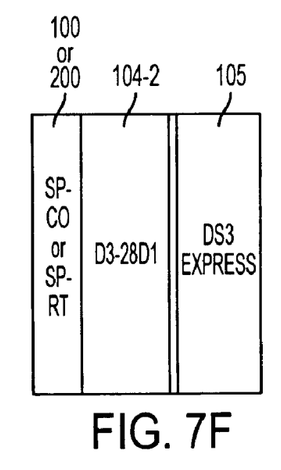

As discussed in the background, the representative enclosure 106 is capable of receiving various combinations of the types of modules described above. Several examples of this configuration are shown in FIGS. 7A-F. FIG. 7A shows an empty enclosure assembly 106 comprising three connectors 122 mounted inside the openings 118 and 120 on the rear panel of the enclosure 106, and are electrically connected to external connectors (not shown). When the modules are loaded into openings 118 and 120, the connectors on the back ends of the modules mate with the respective connectors 122 in the enclosure 108, and thus provide electrical connectivity to the external connectors. The mounting angle 116 is used to mount the enclosure 106. Fan unit 110 provides cooling for the inserted modules and is supplied with power from the span power module SP-RT 200. As shown in FIG. 7B, the assembly 106 can receive two O3D3-type modules 102, which are similar to modules of the O3-3D3 Series 102-4, which includes the O3-3D3 102-1, O3-3D3P 102-2, O3-3D3HP 102-3 and O3-3D3PM modules, as well as a SP-CO module 100 or SP-RT module 200. As shown in FIG. 7C, the assembly 106 can receive a SP-CO module 100 or SP-RT module 200, as well as a module 102 and a D3-14D1 module 104-1 as discussed above. As shown in FIG. 7D, the assembly 100 can receive a O3-3D3 module 102, a D3-28D1 module 104-2 and an SP-CO module 100 or SP-RT module 200 as indicated. As shown in FIG. 7E, the assembly 100 can receive two DS3 Express modules 105 and an SP-CO module 100 or SP-RT module 200 as indicated. The DS3 Express module 105 permit a high speed DS3 circuit to be carried over four standard twisted pair cables. As shown in FIG. 7F, the assembly 100 can receive a D3-28D1 module 104, and a DS3 Express module 105. In addition, other modules not shown that may also be span powered by the SP-CO module 100 and SP-RT module 200, include modules in the G2 family of modules, wave division multiplexing coupler family of modules, the universal program channel access unit family of modules as well as those under development.

Figure 8:
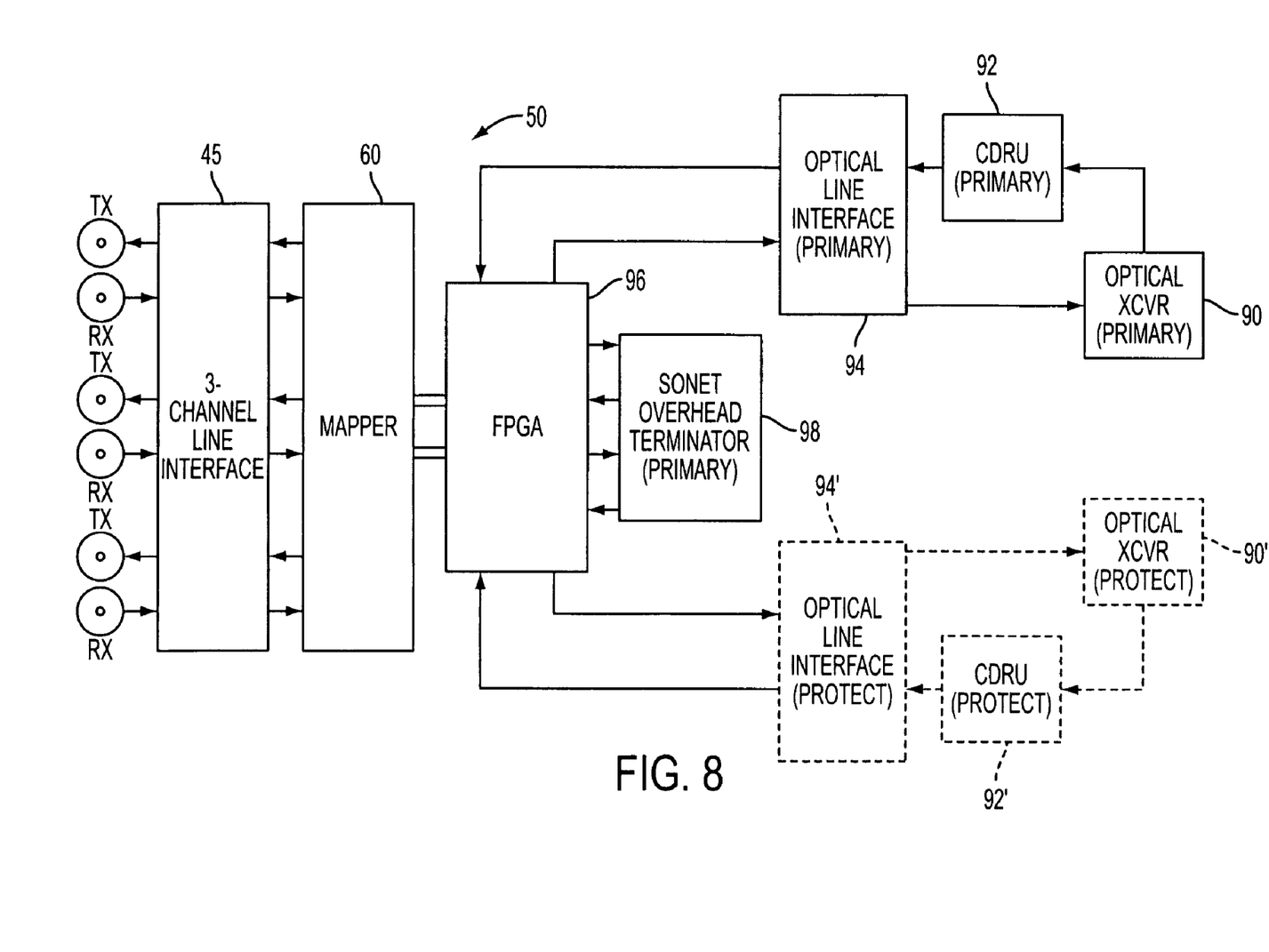
FIG. 8 is an exemplary view of a SONET multiplexer that is span powered by an embodiment of the present invention.

FIG. 8 is an exemplary view of a SONET multiplexer that is powered by an embodiment of the present invention. The three-channel line interface unit (LIU) 45 and associated components, which comprise the SONET multiplexer, are connected to the 3GME backplane or the backplane of other Type 200 mountings, which are powered by the embodiments of the present invention. Briefly, in operation, an optical signal is converted to an electrical format by the optical transceiver 90. A clock data recovery unit (CDRU) 92 obtains the receive clock frequency and receive path optical rate to separate the clock and data and provide the data to an optical line interface unit. The output of the transceiver 90 is processed to determine the boundaries between each bit. This processing is performed by the SONET synchronizers. The data is accepted by the SONET overhead terminator 98 which finds the start of each frame and extracts certain bytes called overhead. Overhead is data in the SONET stream which is not the customer's data. It is additional data used to perform administrative functions such as switch to protect operations. The SONET overhead terminator 98 uses a pointer mechanism to locate the bytes within the SONET stream which are customer data. The three-channel DS3 line interface unit (LIU) 45 can be provided with an optional second OC3 port which can be used to provide protection switching. The optical transceiver 90', a CDRU 92', and optical line interface unit 94' support the second OC3 port. These devices operate with respect to the second OC3 feed in the same manner as stated above in connection with the primary optical transceiver 90, CDRU 92, and primary optical line interface unit 94 and the primary OC3 feed. The pointer and the customer data are handed to the mapper 60 where it is divided into three DS3 streams. The LIU 45 converts three streams of digital data into three standard analog interfaces. The DS3 LIU 45 components are bi-directional and accepts three analog signals and converts them into digital format. The mapper 60 accepts the three digital streams and converts them to a single digital stream in the SONET format. The SONET overhead terminator 98 appends the overhead data to the data received from the mapper 60. Each SONET synchronizer provides the appropriate drive to the corresponding optical transceivers 90 and 90'.

Further, as that described in the above-referenced co-pending patent applications, the mounting arrangements shown in FIGS. 7A through 7F as well as the applications shown in FIGS. 1 through 3 are demonstrative only. Many other mounting configurations and applications are available and can be used.

While the invention herein disclosed has been described by means of specific embodiments and applications thereof, numerous modifications and variations can be made thereto by those skilled in the art without departing from the scope of the invention.

What we claim is:

1. A power supply system for a telecommunication network comprising:
   a first telecommunication power supply module configured for insertion in a single card slot of a telecommunication equipment mounting at a first telephone company equipment location;
   wherein said first telecommunication power supply module provides power to a plurality of second telecommunication modules at a remote telephone company equipment location, wherein said first telecommunication power supply module provides power over telephone wires dedicated to only supplying power; and wherein said plurality of second telecommunication modules at a remote telephone company equipment location comprises high speed communication modules for sending and receiving communication signals, said first telecommunication power supply module providing power to said plurality of second telecommunication modules using up to four twisted-pair telephone wires.

2. The power supply system of claim 1, wherein said plurality of second telecommunication modules send and receive said communication signals over telecommunication network wires other than the four twisted-pair telephone wires used by said first telecommunication power supply module to provide power.

3. The power supply system of claim 2, wherein said four twisted-pair telephone wires are plain old telephone service wires up to 1 mile in length.

4. The power supply system of claim 1, wherein said first and remote telephone company equipment locations are selected from the group consisting of a remote terminal, a controlled environment vault, a hut, a telephone room at a remote site, a telecommunication closet at a remote site.

5. A method for supplying power to remotely located modules on a telecommunication network comprising the steps of:

adapting a first telecommunication power supply module for insertion in a single card slot of a telecommunication equipment mounting at a first telephone company equipment location for supplying power;

sending and receiving communication signals by a plurality of second telecommunication modules at a remote telephone company equipment location comprising high speed communication modules; and providing power to said plurality of second telecommunication modules at a remote telephone company equipment location, wherein said first telecommunication power supply module supplies power to said plurality of second telecommunication modules using up to four twisted-pair telephone wires dedicated to only supplying power.

6. A method for supplying power to remotely located modules on a telecommunication network comprising the steps of:

adapting a first telecommunication power supply module for insertion in a single card slot of a telecommunication equipment mounting at a first telephone company equipment location for supplying power;

sending and receiving communication signals by at least one second telecommunication module at a remote telephone company equipment location comprising a high speed communication module; and providing power to said at least one second module at a remote telephone company equipment location, wherein said first telecommunication power supply module supplies power to said at least one second module using up to four twisted-pair telephone wires dedicated to only supplying power.

7. A power supply system for a telecommunication network comprising:

a first telecommunication power supply module configured for insertion in a single card slot of a telecommunication equipment mounting at a first telephone company equipment location;

wherein said first telecommunication power supply module provides power to at least one second telecommunication modules at a remote telephone company equipment location, wherein said first telecommunication power supply module provides power over telephone wires dedicated to only supplying power; and wherein the second telecommunication module at a remote telephone company equipment location comprises a high speed communication module for sending and receiving communication signals, said first telecommunication power supply module providing power to said second telecommunication module using a twisted-pair telephone wire.

8. The power supply system of claim 7, wherein said at least one second telecommunication module sends and receives said communication signals over telecommunication network wires other than the twisted-pair telephone wire used by said first telecommunication power supply module to provide power.

9. The power supply system of claim 8, wherein said twisted-pair telephone wire is a plain old telephone service wire up to 1 mile in length.

10. The power supply system of claim 7, wherein said first and remote telephone company equipment locations are selected from the group consisting of a remote terminal, a controlled environment vault, a hut, a telephone room at a remote site, a telecommunication closet at a remote site.

* * * * *